United States Patent [19]

Rasmussen et al.

[11] 4,212,482
[45] Jul. 15, 1980

[54] HUB DRIVE FOR BICYCLE SPEEDOMETER

[75] Inventors: Howard J. Rasmussen, Fox River Grove; William C. Subluskey, Chicago, both of Ill.

[73] Assignee: Stewart-Warner Corporation, Chicago, Ill.

[21] Appl. No.: 961,657

[22] Filed: Nov. 17, 1978

[51] Int. Cl.² ............................................. G01C 22/00
[52] U.S. Cl. ...................... 280/289 D; 74/12
[58] Field of Search ........... 280/289 R, 289 D; 74/12; 73/527; 235/95 R, 139 R

[56] References Cited

U.S. PATENT DOCUMENTS

| | | | |
|---|---|---|---|
| 2,120,578 | 6/1938 | Schulze | 74/12 |
| 3,781,036 | 12/1973 | Brilando | 280/289 |
| 4,096,377 | 6/1978 | Prentice et al. | 235/139 R |

*Primary Examiner*—John J. Love
*Assistant Examiner*—Donn McGiehan

[57] ABSTRACT

A speedometer drive for a bi/cycle or exercising/cycle that includes a circular plate rotatable with the front wheel having an annular array of apertures that drives an intermediate plastic idler gear and also axially positions the gear to eliminate the requirement for any thrust rings to position the gear. The intermediate idler gear drives a one-piece plastic out-put gear and coupler. The output gear has a flange that slidably engages a thrust surface on the intermediate idler gear to axial position the output gear so that the output gear does not require any thrust rings either.

10 Claims, 5 Drawing Figures

HUB DRIVE FOR BICYCLE SPEEDOMETER

BACKGROUND OF THE PRESENT INVENTION

In bicycle speedometer drives it is conventional to include an annular gear rotatable with the front wheel of the vehicle coincident with its axis of rotation. A bracket mounted on the frame of the vehicle adjacent this first gear supports an interengaging right angle drive gear that rotates a flexible cable descending from a speedometer mounted on the handlebars of the vehicle. This gear arrangement also provides the proper gear ratio between the front wheel and the speedometer itself.

In some applications it is desirable to reverse the direction of the rotation of the drive such as when the drive unit is mounted on the opposite side of the front wheel from that which the speedometer direction of rotation is normally compatable. In such cases it is necessary to add an intermediate gear between the front wheel driven gear and the output gear to provide this reversal. The addition of this gear and its supporting elements adds additional costs to the speedometer drive assembly so that attempts have been made to reduce the costs of these reversing drive devices to be competitive with standard low cost drives presently available.

SUMMARY OF THE PRESENT INVENTION

In accordance with the present invention, a bicycle speedometer drive assembly is provided that includes an annular plate like gear rotatable with the front wheel of the bicycle that drives an intermediate plastic gear through rectangular annularly arrayed apertures in the plate. These rectangular apertures in the plate maintain the axial position of the intermediate gear so that no snap rings or other axial thrust elements need be provided to align the intermediate gear. The intermediate gear provides a reversal in the direction of rotation of the speedometer cable in applications where a conventional speedometer drive would rotate the speedometer cable and the speedometer in the wrong direction. The intermediate gear is an inexpensive one piece plastic molding that drives a combined one piece output gear and coupler. The output gear has an annular flange adjacent its gear teeth that engage the back surface of the intermediate gear so that the intermediate gear is also maintained axially without the requirement for any thrust rings or other thrust elements otherwise necessary in the rotational mounting of the output gear.

The combined output gear and coupler molded as a one piece element is rotatable within a sationary fitting that does not require the use of any separate mounting shaft for the output gear.

This construction not only eliminates many of the parts normally associated with a bicycle speedometer drive of this type, but also significantly reduces the assembly time and thereby saves labor cost. During assembly the plate gear is positioned between a cup shape member and an "L" shaped bracket carried by the cup shaped member, with both having openings that fit over the front axle of the bicycle. Thereafter, the output gear is slid into the fixed outlet fitting previously staked to the "L" shaped bracket. Thereafter the intermediate gear is slid over a previously mounted shaft parallel on the bracket parallel to the output gear with the back of the intermediate gear acting on the flange of the output gear to position the output gear. No further mounting or assembly steps need be taken to axial position the output gear. At the same time, one or more of the gear teeth of the intermediate gear is snapped into position in one of the rectangular recesses in the plate gear and this completes the lateral and axial location of all the gears without any further fastening devices to maintain the gears in their proper meshing engagement without any significant axial movement.

The combined cost savings in the reduction of parts of the present assembly and in the labor required to assemble this drive result in the bicycle speedometer drive of significantly lower cost than is presently known in the art.

DETAILED DESCRIPTION OF THE PREFERRED EMBODIMENTS

Figure 1:
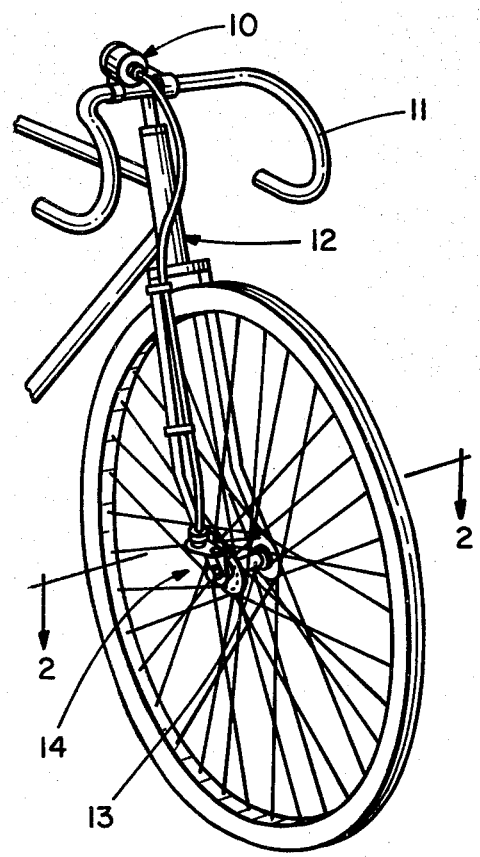
FIG. 1 is a fragmentary view of the front end of a bicycle incorporating a speedometer, a flexible shaft, and a speedometer drive according to the present invention.
Figure 5:
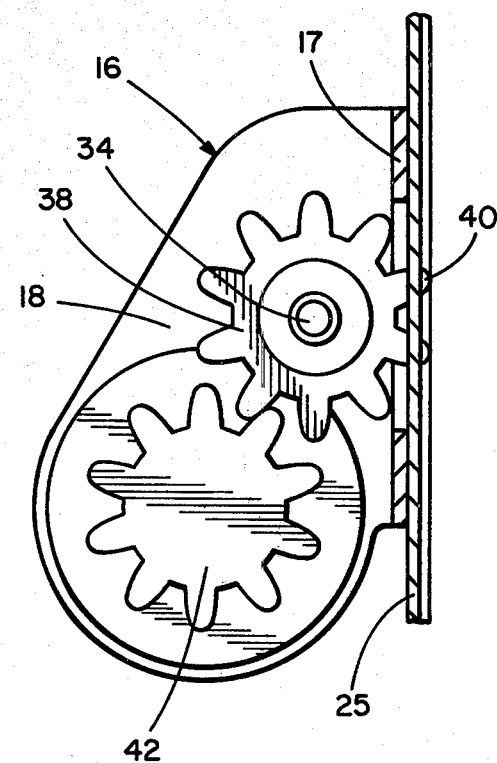
FIG. 5 is a cross-section of the intermediate and output gears taken generally along line 5—5 of FIG. 5.

Viewing the drawings and particularly FIG. 1, wherein the front end of a conventional bicycle is illustrated—a speedometer 10 is shown fixed by a suitable bracket to handlebars 11. A flexible drive cable 12 transmits rotary motion from a hub 13 of the bicycle's front wheel through a speedometer drive assembly 14 which incorporates the basic features of the present invention. It should be understood that while the present speedometer and speedometer drive assembly are shown associated with a conventional bicycle that the speedometer drive could also be used in conjunction with excercising machines of the cycle and pedal type.

Figure 2:
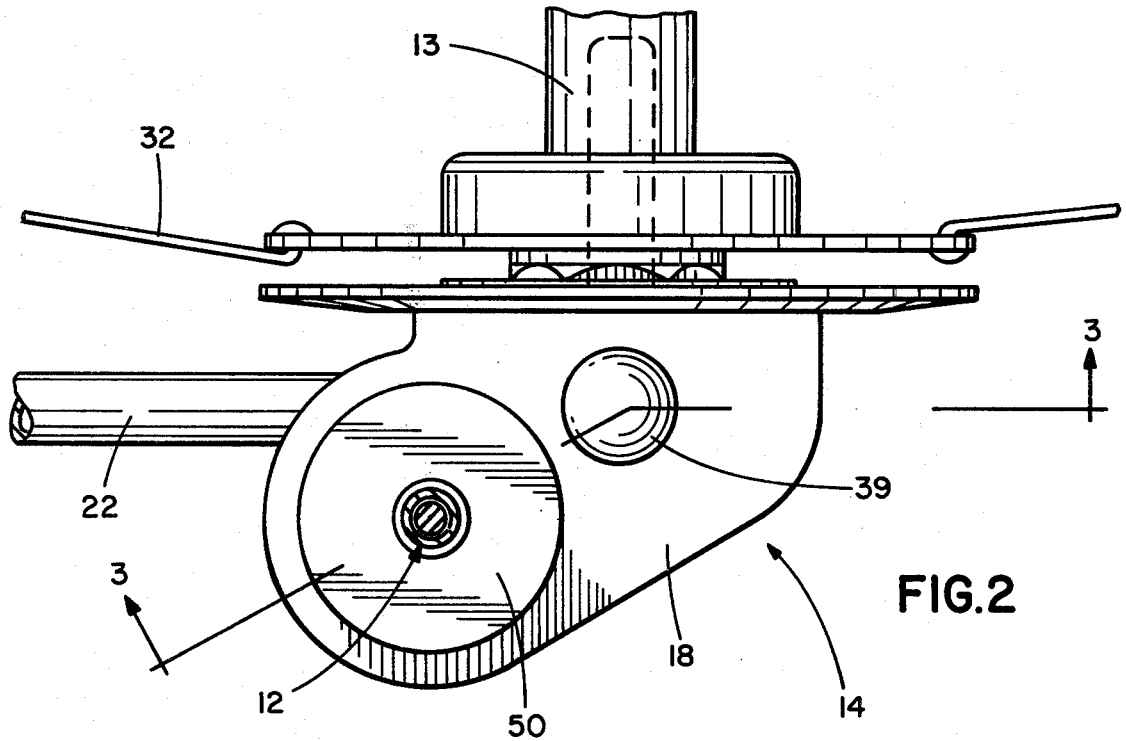
FIG. 2 is a top view of the speedometer drive subassembly taken generally along line 2—2 of FIG. 1.
Figure 4:
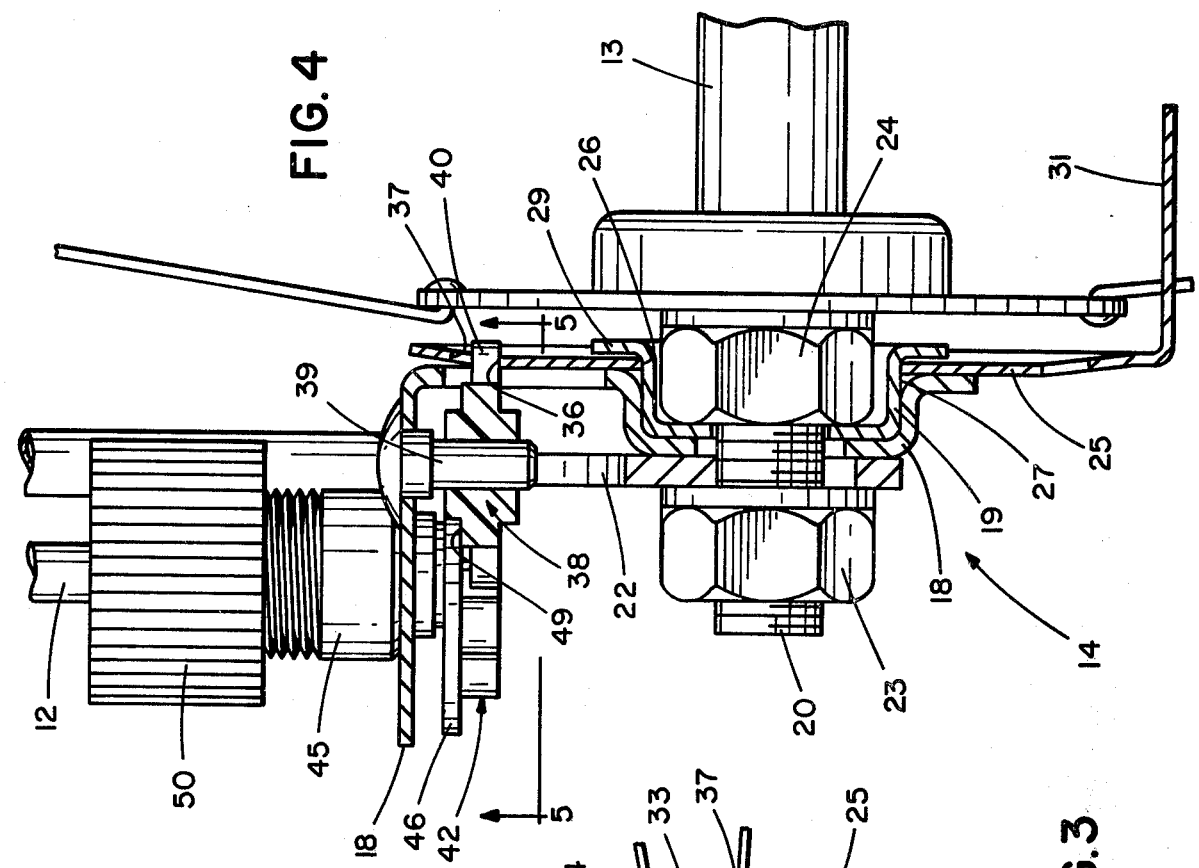
FIG. 4 is a cross-section of the speedometer drive taken generally along line 4—4 of FIG. 3.
Figure 3:
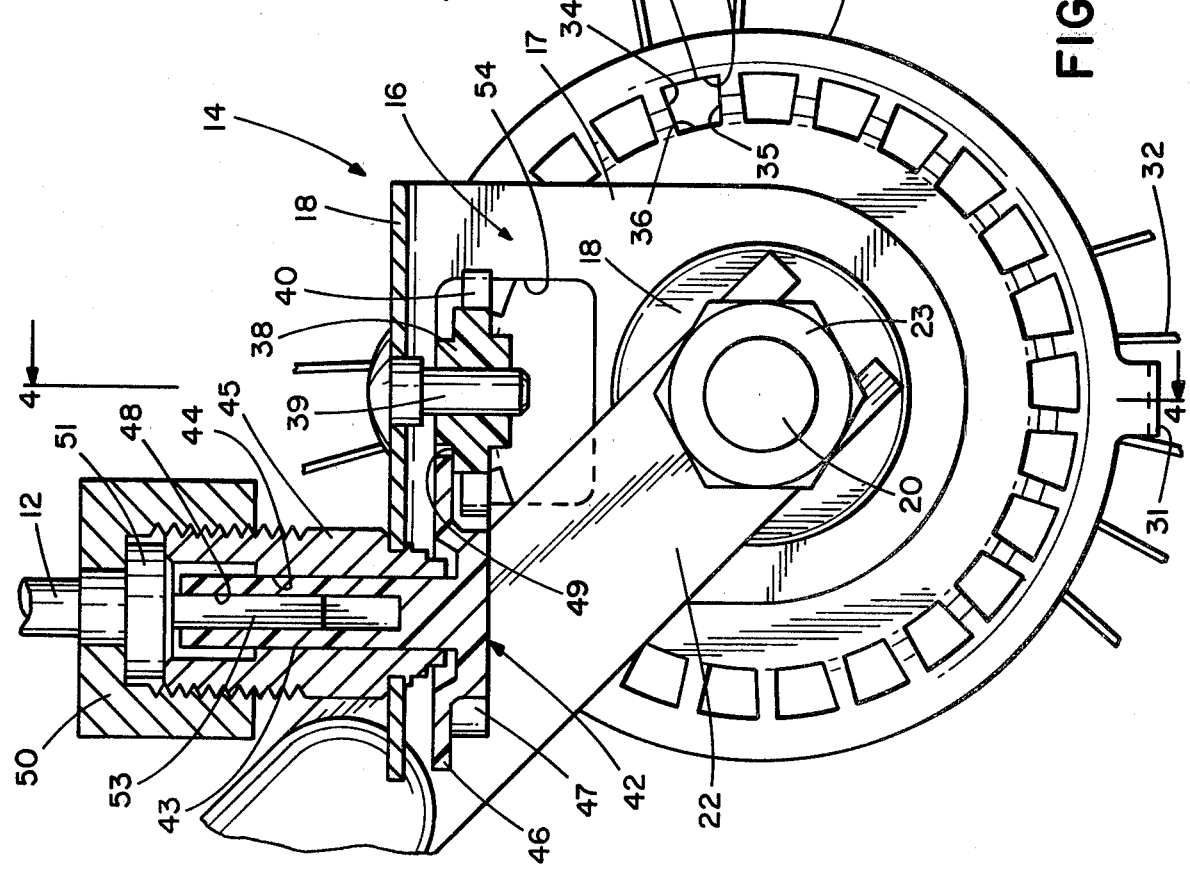
FIG. 3 is a side view partly in section of the speedometer drive taken generally along line 3—3 of FIG. 2.

The speedometer drive assembly as shown in the enlarged views and figures in FIGS. 2, 3, and 4, and as seen to generally include an annular plate gear 25 that drives an output gear 42 through an intermediate reversing gear 38. An "L" shaped bracket 16 having a vertical leg 17 and an outwardly projecting horizontal top leg 18, has a stamped cup shaped central portion 18 that tightly fits on a cup shaped retainer 19. The cup shaped retainer 19 in the bracket leg 17 fit over threaded end 20 of the front wheel axle and are retained in position by front fork frame member 22 and axle nuts 23 and 24 as seen clearly in FIG. 4.

The annular plate gear 25, sometimes referred to in this patent as a first gear, has a central circular opening 26 therein that is rotatably received on an outer cylindrical surface 27 of the cup member 19—also as clearly shown in FIG. 4. There is sufficient clearance between flange 29 on the cup shape member 19 and the upstanding leg 17 of the bracket 16 to permit the plate 25 to freely rotate while at the same time permitting only limited axial movement thereof.

As seen clearly in FIGS. 3 and 4, the plate 25 has an axially extending projection 31 from the periphery thereof which extends and fits between front wheel spokes 32 to provide driving engagement between the spokes and the gear plate 25.

The drive elements of the gear plate 25 are provided by annularly arrayed generally rectangular openings 33 in the plate 25. Each of these apertures 33 has radially extending drive surfaces 34 and 35 and arcuately extending thrust surfaces 36 and 37. The drive surfaces 34 and 35 rotate the intermediate gear 38 while thrust surfaces 36 and 37 acts to axial position the intermediate gear 38.

Intermediate gear 38 is rotatably mounted on a stud shaft 39 mounted in the top leg 18 of bracket 16 for rotation about an axis intersecting and perpendicular to the axis of plate gear 25. Intermediate gear 38 is a one piece plastic molding and has gear teeth 40 which fit within the openings 33 in plate 25 as seen in FIG. 4, so that as the plate gear 25 rotates the intermediate gear 38 will be driven. The bottom edges 36 of the apertures 33 engage the lower sides of the gear teeth 40 to limit movement of the intermediate gear 38 downwardly toward the axis of plate gear 25. The outer surfaces 37 of the recesses 33 limit the movement of the intermediate gear upwardly as seen in FIG. 4. In this manner, the intermediate gear 38 is positioned on its own axis by the plate gear 24 without the requirement for any special fasteners on the stub shaft 34 that rotatably receives intermediate gear 38.

The intermediate gear 38 in turn drives a one piece plastic output gear and coupler 42. Coupler member 42 has a cylindrical portion 43 in a central bore 44 in a cylindrical fitting 45 staked to the top leg 18 of the bracket 16 as shown clearly in FIG. 3. There are no thrust elements in the fitting 45 for axially positioning the gear and coupler member 42 for downward movement. This is accomplished by the provision of an angular flange 46 adjacent gear teeth 47. Flange 46 slidably engages back surface 49 of the intermediate gear 38 and in this manner downward movement of the gear and coupler member 42 is prevented. Teeth 47 are engaged by intermediate gear teeth 40 and in this manner the intergral gear and coupler member is driven in rotation. The coupler member 42 and particularly the cylindrical projection 43 has an irregular aperture 48 therein that receives shaft drive tip 53. Drive tip 53 has a similar irregular configuration so that it rotates with the coupler extension 43. The flexible drive assembly 12 is fixed to the top of the fitting 45 by a cup shaped threaded fitting 50 that engages an angular end flange 51 of the drive cable assembly 12.

During assembly the gear plate 25 is placed over the cup shaped member 19 and the frame bracket cup 18 is pressed over the outside of the cup 19. Thereafter the output gear connector and coupler is slid into the bore 44 of fitting 45 and then the intermediate gear 38 is slid over stud shaft 34 somewhat deforming the plate gear 25 until the teeth 40 snap into one or two of the recesses of 33 in the plate through an opening 54 in bracket leg 36. At the same time the back surface 49 of the intermediate gear 38 engages the flange 46 on the output gear connector 42 to position the member 42 axially. In this manner both the intermediate gear 38 and the output gear connector 42 are maintained in proper position without the need for any additional assembly steps.

What is claimed is:

1. A drive assembly for a bicycle speedometer for transmitting rotary motion from the front wheel of the bicycle to a remotely mounted speedometer, comprising; a frame member adapted to be mounted on the bicycle frame adjacent the front wheel hub, a first gear rotatably mounted on said frame about an axis parallel to the front wheel hub, drive means carried by the first gear to transmit rotary motion from the front wheel to the first gear, a second gear rotatably mounted on said frame for rotation about an axis perpendicular to the axis of rotation of the first gear and engageable with the first gear to be driven thereby, a third gear mounted for rotation on said frame about an axis parallel to the second gear and engaging the second gear to be driven thereby, said second and third gears having interengaging surfaces for maintaining the axial position of the third gear along the axis thereof, said third gear being freely movable axially in at least one direction except for the support of said second gear, and coupling means driven by the third gear adapted to be connected to a flexible drive cable that drives the speedometer.

2. A drive assembly for a bicycle speedometer as defined in claim 1, wherein said interengaging surfaces on the second and third gears include an integral flat annular surface on the second and a cooperating integral annular flange on the third gear.

3. A drive assembly for a bicycle speedometer as defined in claim 2, wherein the second and third gears are one piece plastic moldings.

4. A drive assembly for a bicycle speedometer as defined in claim 1, wherein said third gear and said coupling means are a one piece plastic molding.

5. A drive assembly for a bicycle speedometer as defined in claim 1, wherein said first gear includes an annular plate that has an annular array of generally rectangular openings therein engageable with the second gear to both drive the second gear and position it axially in both directions.

6. A drive assembly for a bicycle speedometer for transmitting rotary motion from the front wheel of the bicycle to a remotely mounted speedometer, comprising; a frame member adapted to be mounted on the bicycle frame adjacent the front wheel hub, a first gear rotatably mounted on said frame about an axis parallel to the front wheel hub, drive means carried by the first gear to transmit rotary motion from the front wheel to the first gear, a second gear rotatably mounted on said frame for rotation about an axis perpendicular to the axis of rotation of the first gear to be driven thereby, and a third gear mounted for rotation on said frame about an axis parallel to the second gear and engaging the second gear to be driven thereby, said first gear including an annular plate having an annular array of openings therein engageable with the second gear to drive the second gear and also to position it axially in both directions, said second gear being freely movable axially except for the supporting said annular plate.

7. A bicycle speedometer assembly comprising; a speedometer having a bracket mountable on the handlebars of a bicycle, a flexible drive cable connected to drive the speedometer, a drive frame mountable adjacent the front wheel hub of the bicycle, a first gear mounted on the drive frame for rotation by the front wheel about an axis parallel to the front wheel, a second plastic gear mounted on the drive frame about an axis perpendicular to the first gear and engageable by the first gear to be driven thereby, said first gear having axial thrust surfaces for maintaining the axial position of the second gear in both directions, a third plastic gear mounted for rotation on said drive frame about an axis parallel to the second gear and engageable with the second gear to be driven thereby, said second and third gears having interengageable axial thrust surfaces so that the second gear maintains the axial position of the third gear, said third gear having an integral extension that forms a coupler to the drive cable.

8. A bicycle speedometer assembly, comprising; a speedometer having a bracket adapted to be connected to the bicycle handle bars, a flexible drive cable connected to drive the speedometer, a drive frame including a "L" shaped bracket mountable adjacent the front wheel hub of the bicycle, a first gear including an annular plate rotatably mounted on said bracket about an axis coincident with the axis of the front wheel, said plate having an annular array of generally rectangular apertures therein, a projection on the plate interengageable with the front wheel so that the wheel drives the first gear, a second plastic gear having gear teeth mounted for rotation on said bracket about an axis perpendicular to the first gear, the teeth on the second gear being receivable in the rectangular apertures in the first gear plate so that the first gear drives the second gear and also positions it axially, a third plastic gear having teeth mounted for rotation on said bracket about an axis parallel to the second gear and engaging said second gear to be driven thereby, said second gear having an annular thrust surface on one side thereof, said third gear having an annular flange extending therefrom and engaging the annular surface on the second gear to maintain the axial position of the third gear in at least one direction, and a connector formed integrally with the third gear and drivably receiving the flexible cable.

9. A method of assembling a bicycle speedometer drive, comprising; the steps of forming a bracket having a generally "L" shaped configuration, forming a plate-like gear and mounting it for rotation on the bracket about a first axis, mounting an output gear on the bracket for rotation about a second axis perpendicular the first gear, and thereafter mounting an intermediate gear for rotation on the bracket about an axis parallel to the second axis and engaging the first and output gears and also axially engaging the output gear to maintain its axial position.

10. A method of assembling a bicycle speedometer drive as defined in claim 9, wherein the step of forming the plate-like gear includes the step of forming an annular array of generally rectangular apertures therein, and wherein the step of mounting the intermediate gear includes engaging the intermediate gear so that it is driven by the apertures in the plate-like gear.

* * * * *